United States Patent
Toksoz et al.

(10) Patent No.: US 11,544,357 B2
(45) Date of Patent: Jan. 3, 2023

(54) SYSTEMS AND METHODS FOR AUTHENTICATION

(71) Applicant: GOOGLE LLC, Mountain View, CA (US)

(72) Inventors: Tuna Toksoz, Mountain View, CA (US); John Dukellis, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/756,332

(22) PCT Filed: Nov. 2, 2018

(86) PCT No.: PCT/US2018/058975
§ 371 (c)(1),
(2) Date: Apr. 15, 2020

(87) PCT Pub. No.: WO2020/091809
PCT Pub. Date: May 7, 2020

(65) Prior Publication Data
US 2021/0216614 A1 Jul. 15, 2021

(51) Int. Cl.
*G06F 21/31* (2013.01)
*G06F 8/61* (2018.01)
(Continued)

(52) U.S. Cl.
CPC ............... *G06F 21/31* (2013.01); *G06F 8/61* (2013.01); *G06F 9/445* (2013.01); *H04L 9/32* (2013.01); *H04L 67/06* (2013.01); *H04L 67/10* (2013.01)

(58) Field of Classification Search
CPC . G06F 21/31; G06F 8/61; G06F 9/445; H04L 9/32; H04L 67/10; H04L 67/06
See application file for complete search history.

(56) References Cited

U.S. PATENT DOCUMENTS 8,613,108 B1 * 12/2013 Aggarwal ............... G06F 21/10
726/29
8,850,527 B2 * 9/2014 Chew ...................... H04L 63/10
726/4
(Continued)

FOREIGN PATENT DOCUMENTS

AU 2018101455 A4 11/2018
EP 575322 A1 * 12/1993 ......... G03G 15/0121
(Continued)

OTHER PUBLICATIONS

"Transferring user data to a new device with Smart Lock, Google Sign-In, and Auto Backup"—Jessica Thornsby, Android Authority, Mar. 8, 2018 https://www.androidauthority.com/transferring-user-data-to-new-device-842440/ (Year: 2018).*
(Continued)

*Primary Examiner* — Randy A Scott
(74) *Attorney, Agent, or Firm* — Marshall, Gerstein & Borun LLP

(57) ABSTRACT

The present disclosure provides systems and methods for parameterized application installation. A client device may provide authentication credentials of a user to an authentication server, which may store an association between the user and a content item linking to an application and identifying a parameter for use by the application. The client device may download and install the application via an application server or application store. Once installed, the application may re-provide the authentication credentials to the authentication server, which may retrieve the association, and provide the parameter for use by the application. Thus, the application server or application store may continue to discard referrer information or parameters for the application, but the application may still receive and utilize the parameters without further user intervention.

20 Claims, 5 Drawing Sheets

Application identifier uri://appstore.com/id12345&p=6789

Application parameter

(51) Int. Cl.
*G06F 9/445* (2018.01)
*H04L 9/32* (2006.01)
*H04L 29/08* (2006.01)
*H04L 67/06* (2022.01)
*H04L 67/10* (2022.01)
*H04L 29/06* (2006.01)
*H04L 9/08* (2006.01)
*H04L 9/06* (2006.01)

(56) References Cited

U.S. PATENT DOCUMENTS

2003/0188195 A1* 10/2003 Abdo .................. H04L 63/08
709/227
2017/0041304 A1 2/2017 Tal et al.

FOREIGN PATENT DOCUMENTS

EP        2 575 322 A1     4/2013
WO   WO-2017/210063 A1   12/2017

OTHER PUBLICATIONS

"Force Reauthentication in ODIC"—Auth 0, Jun. 2018 https://auth0.com/docs/authenticate/login/max-age-reauthentication (Year: 2018).*
International Search Report and Written Opinion for PCT Appln. Ser. No. PCT/US2018/058975 dated Jul. 26, 2019 (12 pages).
International Preliminary Report on Patentability, Ch. I, for PCT Appln. Ser. No. PCT/US2018/058975 dated May 14, 2021 (7 pages).
Office Action KR Appln. Ser. No. 10-2020-7009095 dated May 11, 2021 (6 pages).
Examination Report for IN Appln. Ser. No. 202027011566 dated Jun. 22, 2021 (6 pages).

* cited by examiner

SYSTEMS AND METHODS FOR AUTHENTICATION

BACKGROUND

Applications may be installed on computing devices via application servers or application stores, which allow users to search for, download, and install applications. Application publishers may wish to authenticate users in order to, for example, customize applications or provide custom content for particular users (or groups of users). One way to authenticate users is to provide links to the application, the links comprising customized parameters that are passed to the application store when the link is followed. For example, a link provided to system administrators may comprise different custom parameters to a link provided to users, thereby allowing an application to be customized differently for the administrators and the users, or different content may be provided within the application to administrators and users. However, many application stores or application servers prevent passing customized parameters, such as parameters provided via content which links to the application, to applications after installation. Customization of the application or provision of content specific to the user (or group of users) may be difficult, if not impossible, and may require further interaction between the user and the publisher after installation of the application.

SUMMARY

The systems and methods discussed herein provide for parameterized application installation. A client device may provide authentication credentials of a user to an authentication server, which may store an association between the user and a content item linking to an application and identifying a parameter for use by the application. The client device may download and install the application via an application server or application store. Once installed, the application may re-provide the authentication credentials to the authentication server, which may retrieve the association, and provide the parameter for use by the application. Thus, the application server or application store may continue to discard referrer information or parameters for the application, but the application may still receive and utilize the parameters without further user intervention.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Applications may be installed on computing devices via application servers or application stores, which allow users to search for, download, and install applications. Application publishers may wish to customize applications or provide customized content to specific users or groups of users, for example for security reasons. However, many application stores or application servers prevent passing customized parameters, such as parameters provided via links, to applications after installation. Customization of the application or provision of content specific to the user (or group of users) may be difficult, if not impossible, and may require further interaction between the user and the publisher after installation of the application.

Figure 1A:
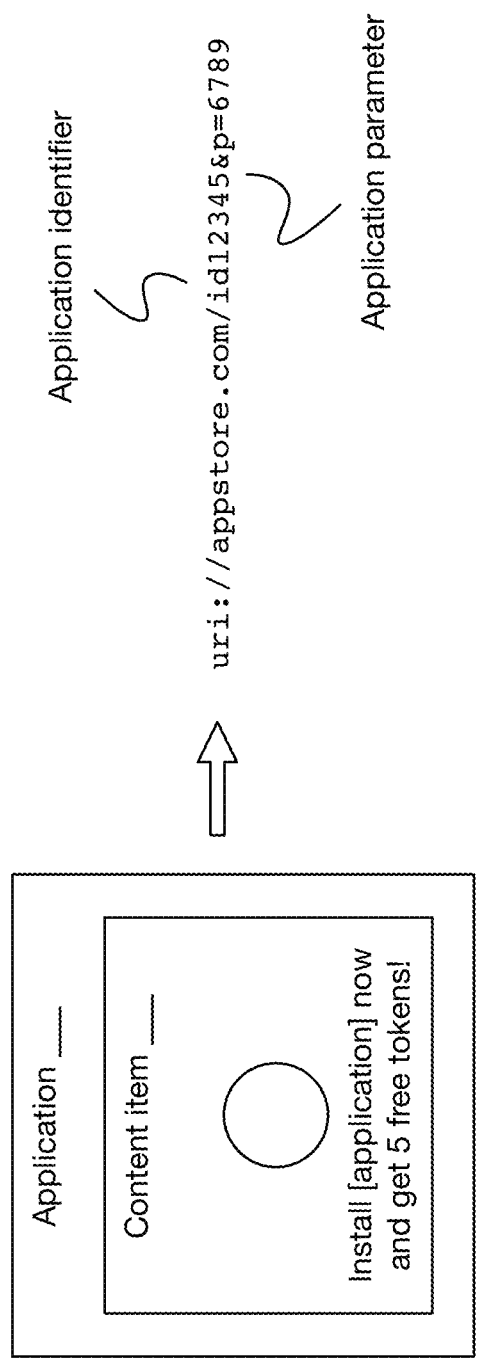
FIG. 1A is an illustration of a content item including a parameter for use by an application, according to some implementations.

For example, FIG. 1A is an illustration of a content item 102 including a parameter for use by an application, according to some implementations. The content item 102 may be presented within an application 100, such as a web browser, mobile game, desktop application, or any other such application, which may be referred to variously as a first application, host application, browser application, game application, referring application, or by any other such term. The content item 102 may comprise a graphic, text, video, animation, or other media, and may be directed to (e.g. intended for) one or more users who subsequently install and launch the associated application, referred to variously as a new application, client application, second application, referred application, or by any other such term. For example, as shown, a content item 102 may include an offer to install an application.

The content item 102 may be associated with or comprise an application identifier and application parameter to be provided to the new application upon installation. In many implementations, the content item 102 may comprise a link or address for an application via an application server or application store, such as a uniform resource locator (URL) or uniform resource identifier (URI). Selecting the link may cause the client device to load the corresponding URL or URI within another application, such as an App Store application, which may allow the user to download and install the new application. Although shown as a parameterized URI, in many implementations, the application parameter may be provided via a referrer tag or similar metadata.

As discussed above, in many implementations, application servers, application stores, or App Store applications may remove parameters from requests or remove referrer tags or otherwise prevent passing parameters from the referring content item 102 to the new application, thereby making it difficult or impossible to authenticate the user and to provide a customized application or custom content within the application.

Figure 1B:
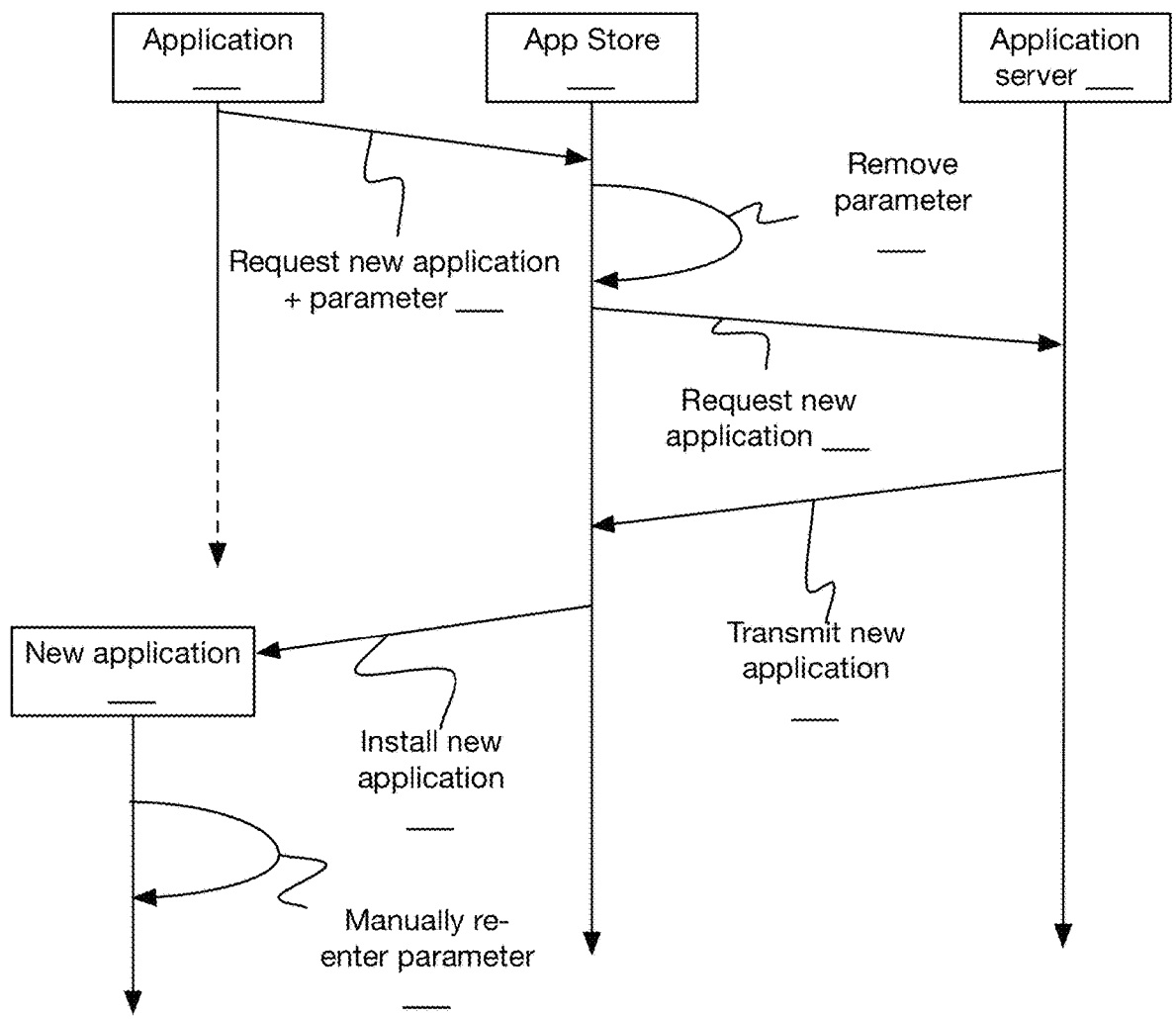
FIG. 1B is a signal flow diagram illustrating an implementation of application installation in which parameters are lost.

For example, FIG. 1B is a signal flow diagram illustrating an implementation of application installation in which parameters are lost. A first application 100 such as a web browser or game executed by a client device may display a content item comprising a link to a second application and a parameter to be utilized by the application. Upon selection of the content item or link by a user, at step 120, the application 100 may provide a request comprising the new application and parameter to an App Store 104. The App Store 104 may comprise an application on the client device or a web page or network application provided by a server. The App Store 104 may process the request by removing the parameter or referrer tag at step 122 and requesting the second application from an application server 106 or content delivery network at step 124. The request for the second application may comprise a request transmitted over a network, such as an HTTP or FTP request from an App Store application on the client device for the application. The application server 106 may respond with the new application at step 126, and installed by the App Store application or an operating system of the client device at step 128. Installation may include decompressing a compressed application, installing or modifying system libraries, or performing other such functions. The new application 108 may be automatically launched upon installation, in many implementations, or may be manually launched by a user of the client device. However, because the parameter was removed from the request at step 122, a user may need to manually re-enter the parameter at step 130 in order for the new application 108 to utilize the parameter. For example, a content item 102 may include an alphanumeric code, and the user may need to manually enter the alphanumeric code. In addition to requiring extra effort by the user, such methods may be insecure, as users may share unlock codes with each other, allowing a user to whom the content item was not provided by the publisher to nonetheless obtain the version of the application or the customized content intended for a different user or group of users.

Instead, the systems and methods discussed herein provide for parameterized application installation by utilizing an authentication server to maintain an association between users and a customized application or customized content. A client device may provide authentication credentials of a user to an authentication server, which may store an association between the user and a content item and identifying a parameter for use by the application. The client device may download and install the application via an application server or application store. Once installed, the application may re-provide the authentication credentials to the authentication server, which may retrieve the association, and provide the parameter for use by the application. Thus, the application server or application store may continue to discard referrer information or parameters for the application, but the application may still receive and utilize the parameters without further user intervention.

Figure 1C:
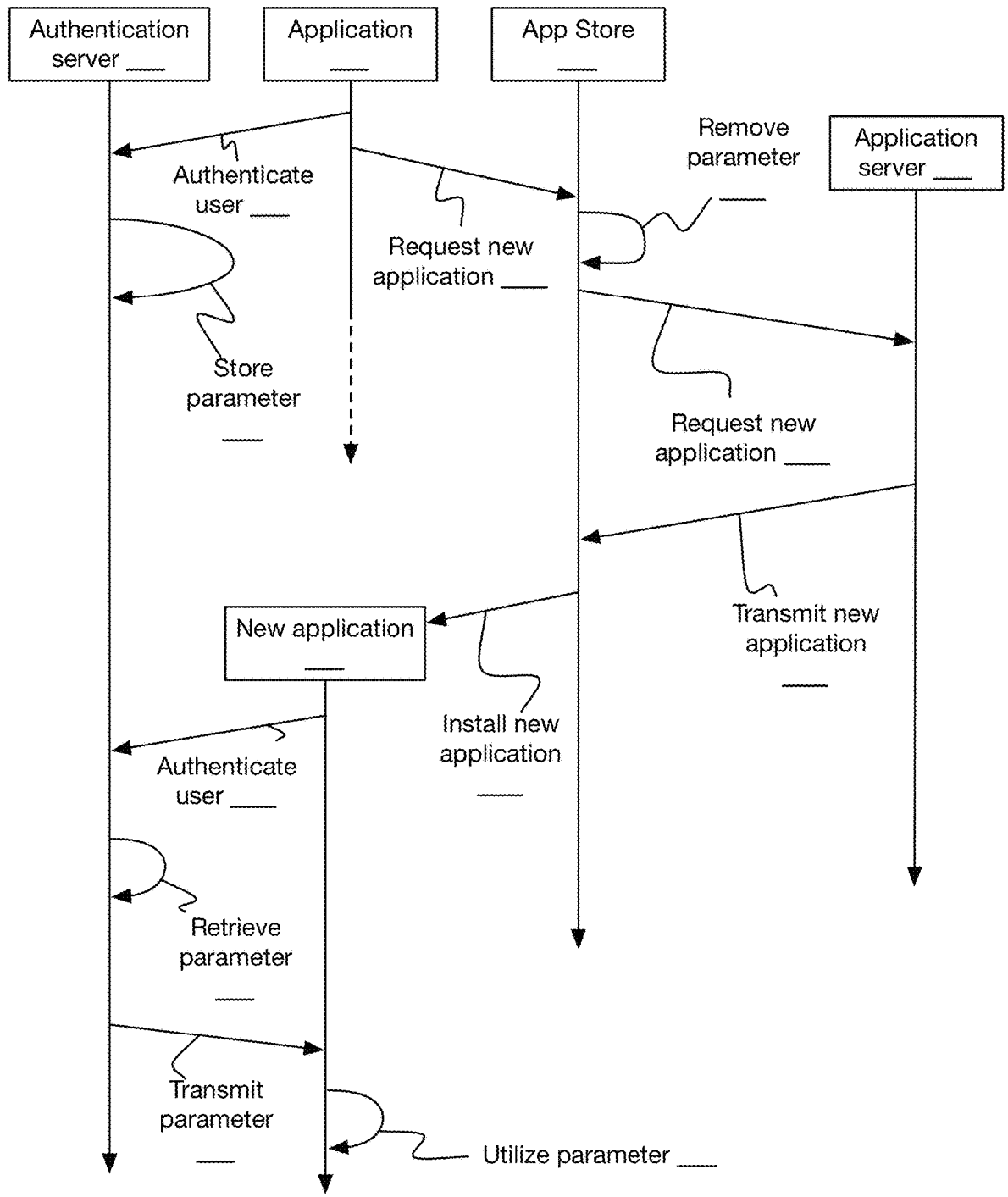
FIG. 1C is a signal flow diagram illustrating parameterized application installation and launch, according to some implementations.

For example, FIG. 1C is a signal flow diagram illustrating parameterized application installation and launch, according to some implementations. Upon selection of the content item 102, the first application 100 may provide authentication credentials of the user to an authentication server 110 at step 150. Providing the authentication credentials may comprise displaying a login prompt to the user in some implementations, or may comprise utilizing login information or authentication information already used by the application 100 (e.g. an authentication token obtained during an earlier authentication process). In some implementations, the user may be prompted to register a new account, and authentication credentials may be created for the user and/or device. The authentication server may store an association between the authentication credentials and the content item 102 or a parameter of the content item to be provided to the new application. The stored association may include additional details, such as a device identifier, cryptographic key or shared secret, or an expiration date upon which the association may be discarded.

As discussed above in connection with FIG. 1B, at step 120', the application 100 may provide a request to an App Store 104 comprising an identifier of the application (and potentially including the parameter or referrer tag). As discussed above, the App Store 104 may remove the parameter at step 122', request the new application at step 124' from the application server 106, receive the transmission of the new application at step 126', and install the new application 128'. However, rather than requiring the user to manually enter the parameter, the new application 108 may re-provide the authentication credentials to the authentication server 110. Re-providing the authentication credentials may include displaying a login prompt to the user in some implementations, or may comprise retrieving login information or authentication information from the first application 100. In some implementations, the new application 108 may provide an authentication token received by the first application 100. Upon authentication of the user or device, the authentication server 110 may retrieve the corresponding parameter of the content item at step 154, and may transmit the parameter to the new application at step 108. The parameter may be provided via any suitable means, such as an HTTP request/response, a remote procedure call, or other such method. In some implementations, the parameter may be encrypted for transmission via a shared secret associated with the authorization credentials. At step 158, the new application 108 may utilize the parameter, e.g. to download further data for the new application from a publisher or content delivery network, etc.

Figure 2:
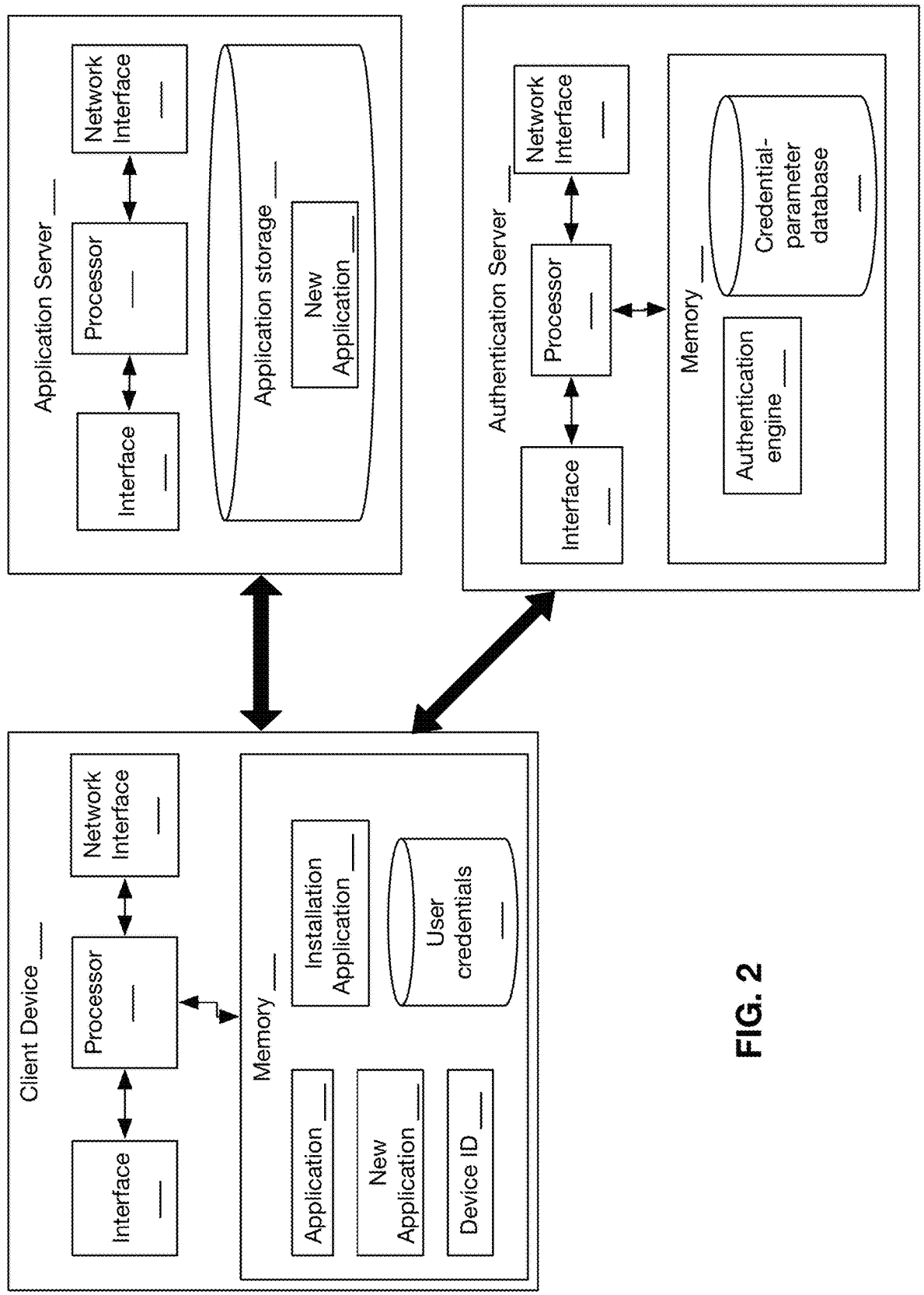
FIG. 2 is a block diagram illustrating implementations of computing devices for use with parameterized application installation and launch.

FIG. 2 is a block diagram illustrating implementations of computing devices for use with parameterized application installation and launch. As discussed above, client device(s) 250 may be referred to variously as a client, device, client device, computing device, user device, or any other such term, and may comprise any type and form of computing device, including a desktop computer, laptop computer, portable computer, tablet computer, wearable computer, embedded computer, smart television, console, Internet of Things (IoT) device or smart appliance, or any other type and form of computing device.

In many implementations, client device 250 includes a processor 200 and a memory 206. Memory 206 may store machine instructions that, when executed by processor 200 cause processor 200 to perform one or more of the operations described herein. Processor 200 may include a microprocessor, ASIC, FPGA, etc., or combinations thereof. In many implementations, processor 200 may be a multi-core processor or an array of processors. Memory 206 may include, but is not limited to, electronic, optical, magnetic, or any other storage devices capable of providing processor 200 with program instructions. Memory 206 may include a floppy disk, CD-ROM, DVD, magnetic disk, memory chip, ROM, RAM, EEPROM, EPROM, flash memory, optical media, or any other suitable memory from which processor 200 can read instructions. The instructions may include code from any suitable computer programming language such as, but not limited to, C, C++, C#, Java, JavaScript, Perl, HTML, XML, Python and Visual Basic.

Client device 250 may include one or more network interfaces 202. A network interface 202 may include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network. In many implementations, client device 250 may include a plurality of network interfaces 202 of different types, allowing for connections to a variety of networks, e.g. such as the Internet via different sub-networks.

Client device 250 may include one or more user interface devices 204. A user interface device 204 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of client device 250, such as a built-in display, touch screen, microphone, etc., or external to the housing of client device 250, such as a monitor connected to client device 250, a speaker connected to client device 250, etc., according to various implementations.

Client device 250 may include in memory 206 an application 100 or may execute an application 100 with a processor 200. Application 100 may be an application, applet, script, service, daemon, routine, or other executable logic for receiving content and displaying or otherwise outputting content via an output interface 204 of the client device (e.g. display, speaker, etc.). In some implementations, application 100 may be a web browser, mail client, video player, music player, video game, or any other such application. Application 100 may include functionality for displaying content received via network interface 202 and/or generated locally by processor 200. In some implementations, application 100 may be a media player or include an embedded media player, such as a plug-in or native media player within a web browser. Such applications 100 may include a command line interface, graphical user interface, or any combination of these or other interfaces.

Client 250 may execute an installation application 104. Installation application 104 may comprise an application, service, daemon, routine, or other executable logic for retrieving and installing applications. In many implementations, installation application 104 may comprise an App Store application, a browser, or other such application. In some implementations, installation application 104 and application 100 may be the same application. In some implementations, installation application 104 may comprise a network application or software-as-a-service application provided by an application server and rendered within a browser of client device 250. As discussed above, in many implementations, installation application 104 may receive a URI or URL or other identifier of an application to be installed, and may receive a parameter to be passed to the application on installation; however, the installation application 104 may remove, disregard, or otherwise not provide the parameter to the new application after installation. In such implementations, the parameter may be provided via authentication server 110 as discussed above.

As discussed above, client device 250 may retrieve and install a new application 108, sometimes referred to as a received application, second application, installed application, or by other such terms. The new application 108 may be referred to as a second application, installed application, retrieved application, downloaded application, or by any other such term, and may be retrieved from an application server 106 by installation application 104 and installed. In some implementations, installing the application may include decompressing or decrypting the application, installing libraries of the application into an operating system of the device, or otherwise installing one or more portions of the application for execution. In many implementations, the new application 108 may be executed upon installation, while in other implementations, the new application 108 may be executed responsive to a selection by the user to execute the application after installation.

Client device 250 may include or be identified with a device identifier 208. Device identifier 208 may be an alphanumeric string, data string, serial number, media access control (MAC) address, internet protocol (IP) address, username or account name, globally unique identifier (GUID), cookie, random or pseudorandom number, or any other type and form of identifier, including combinations of these or other identifiers. In some implementations, the device identifier 208 may be fixed to the device or preconfigured in the device, such as a manufacturer serial number or MAC address, while in other implementations, the device identifier 208 may be dynamically set by a content provider, streaming server, application 100, or other entity, such as a cookie or username. In some implementations, a unique or new device identifier 208 may be set for each communication to a content provider or authentication server 110, while in other implementations, the device identifier 208 may not be changed, or may be changed periodically (e.g. hourly, daily, weekly, etc.) or at other intervals (e.g. on restart of the client device, login to an internet service, etc.). In some implementations, a device identifier 208 may be associated with one or more other device identifiers 208 (e.g., a device identifier for a mobile device, a device identifier for a home computer, etc.). In many implementations, as discussed above, a device identifier 208 may be generated and/or transmitted to the device 250 by an authentication server. In other implementations, as discussed above, client 250 may request a device identifier from an authentication server 110, and may transmit the device identifier to the authentication server 110 in association with requests for content or application parameters.

Client device 250 may include user credentials 210. User credentials 210 may be any type and form of identifier or credentials, including a user name, password, account name, account identifier, pass phrase, biometric data such as a fingerprint, facial scan data, retinal information, or voiceprint, or any other type and form of user-specific information. In many implementations, the client device 250 may receive user credentials in response to display of a login prompt by application 100 and/or new application 108. In some implementations, client device 250 may store user credentials temporarily, e.g. during execution of an application or for a predetermined time period. For example, in one such implementation, a user may execute application 100 and provide credentials to the application, which may be stored in memory 206 of the device. Subsequently, the user may elect to download and install a new application, and the application 100 may retrieve the user credentials 210 from memory and provide the user credentials to an authentication server 110. In many implementations, user credentials 210 may be encrypted, hashed, or otherwise obfuscated to protect user privacy and security. In many implementations, user credentials may be provided to an authentication server 110 via an authentication process: the user credentials, or a hash of the user credentials, may be provided to authentication server 110, which may match the hash or credentials to those in a database of the server; upon identifying a match, the authentication server may determine the user or device is authorized or authentic, and may respond with an authorization token or other data indicating that the device is authorized. The device may utilize the authentication token with third party servers, applications, or other entities.

A client device 250 may communicate with an application server 106 and an authentication server 110 via one or more networks. The networks may comprise any type and form of network, including local area networks (LANs), wide area networks (WANs) such as the Internet, satellite networks, cable networks, broadband networks, fiber optic networks, microwave networks, cellular networks, wireless networks, or any combination of these or other such networks. The networks may be the same type of network or different types, and may include a plurality of additional devices (not illustrated), including gateways, modems, firewalls, routers, switches, etc. The networks may also include any number of computing devices (e.g., computer, servers, routers, network switches, etc.) that are configured to receive and/or transmit data within the network. The network may further include any number of hardwired and/or wireless connections. A client device 250 may communicate wirelessly (e.g., via WiFi, cellular, radio, etc.) with a transceiver that is hardwired (e.g., via a fiber optic cable, a CAT5 cable, etc.) to other computing devices in the network. In some implementations, a network may be a virtual network, such as a virtual network between a plurality of virtual machines executed by a single physical machine, or an abstract network such as an offline transfer of data via physically movable media (e.g. a Sneakernet, transferring data via tape media, CD-ROM, flash media, external hard drives, floppy disks, etc.).

Also illustrated in FIG. 2 is a block diagram of an implementation of an application server 106. As with client devices 250, intermediary server 106 may include one or more processors 200, memories or storage devices 206, network interfaces 202, and user interfaces 204. In some implementations referred to as headless servers, a server 106 may not include a user interface 204, but may communicate with clients 250 or content providers with user interfaces 204 via a network. In some implementations, memory 206 may store one or more applications for execution by processor 200 of the server, including FTP servers, web servers, mail servers, file sharing servers, peer to peer servers, or other such applications for delivering content or redirection commands to allow clients to access content at a content provider. Application server 106 may comprise any type and form of computing device, including desktop computers, servers, workstations, laptop computers, portable computers, embedded computers, or any other type and form of computing device. In many implementations, application server 106 may comprise one or more virtual machines executed by one or more physical computing devices, and may be configured as a server farm, cluster, or cloud of devices.

Application server 106 may include application storage 212 storing one or more applications 108 for retrieval and installation by client devices 250. Applications 108 may be identified via a URI or URL or other application identifier as discussed above, and may be compressed, encrypted, or otherwise packaged for download and installation. In many implementations, applications 108 may comprise application installers for given applications, including instructions for installing various application libraries, packages, and other executables of the application.

As discussed above, in many implementations, application server 106 may be unable to or configured not to provide parameters to a new application 108 upon installation on a client device 250. In many implementations, such parameters may be removed by an installation application 104 of the client device; while in other implementations, such parameters may be removed or disregarded by application server 106.

Also illustrated in FIG. 2 is an authentication server 110. Authentication server 110 may include one or more computing devices connected to network and configured for performing authentication with a client 250, and for storing and providing application parameters for use by new applications 108. Authentication server 110 may be referred to variously as a content provider, server, web server, data server, publisher, service provider, or by other similar terms. In many implementations, authentication server 110 may include a plurality of computing devices configured as a server farm or cloud, and may include routers, load balancers, network address translators, firewalls, or other such devices. Authentication servers 110 may be computer servers (e.g., FTP servers, file sharing servers, web servers, etc.) or combinations of servers (e.g., data centers, cloud computing platforms, etc.). Authentication servers 110 may also be content providers, and provide any type and form of content, including text, images, video, audio, multimedia, or other data, or any combination of these. For example, in some implementations, an authentication server 110 may be an application server 106. In such implementations, an installation application 104 may remove application parameters as discussed above, such that the authentication server 110 must receive the parameters from application 100 or an identification of a corresponding presentation of a content item 102 in order to provide the parameters to new application 108 upon installation.

Authentication server 110 may include one or more processors 200, network interfaces 202, I/O interfaces 204, and/or memory devices 206 as shown. In many implementations, authentication server 110 may comprise a plurality of computing devices, including virtual machines executed by physical devices. For example, an authentication server 110 may comprise a plurality of virtual machines executed by one or more physical computing devices, each such virtual machine executing a content server (e.g. web server, file server, streaming media server, etc.) and in communication with one or more storage devices, such as network storage devices, RAID storage devices, or other such devices.

Authentication server 110 may comprise or execute an authentication engine 212. Authentication engine 212 may comprise an application, server, service, daemon, routine, or other executable logic for receiving authentication credentials from a client device 250, and for storing and/or retrieving parameters associated with the user credentials and content items, e.g. in a credential-parameter database 214. Credential-parameter database 214 may comprise any type and form of data storage, including a database, flat file, relational database, array, or other structure capable of associating a device identifier 208 or user identifier with a content item 102, parameter for use by an application, or other corresponding identifier. In many implementations, credential-parameter database 214 may be further associated with an application to use the parameter, e.g. application 108. For example, credential-parameter database 214 may be indexed by application, which may speed up search and retrieval of user credentials and parameters upon receipt of a request from the application. Credential-parameter database 214 may thus store application identifiers, content item identifiers, user or device identifiers, parameters for use by applications, or a combination of these identifiers or data. In many implementations, each entry or association may be further associated with an expiration time or duration. Upon expiration of the duration or expiration time, the corresponding association or entry may be removed, thereby further improving security by allowing associations to 'time out' or expire.

Figure 3:
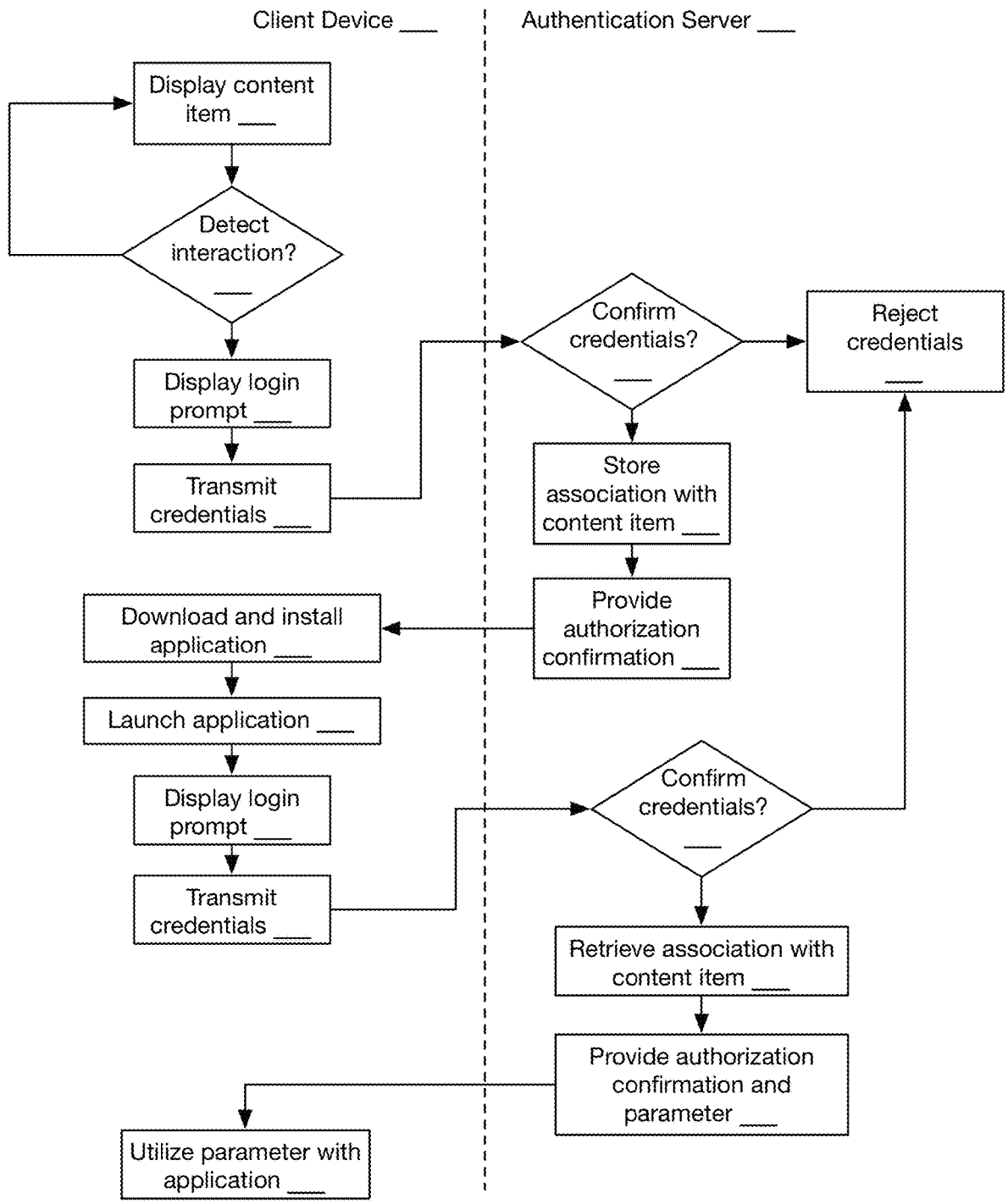
FIG. 3 is a flow chart illustrating an implementation of a method for parameterized application installation and launch.

FIG. 3 is a flow chart illustrating an implementation of a method for parameterized application installation and launch. At step 300, a client device 250 may display a content item. The content item may be displayed in a first application, such as a web browser, game, or other such application, e.g. as a banner ad, pop-up ad, interstitial ad, pre-roll or post-roll ad, link, graphic, or other such item. The content item may comprise a link to or address of a second application, such as a URL or URI corresponding to the second application at an application store or application server, and a parameter to be utilized by the second application upon installation. The parameter may be stored within the URI or URL (e.g. as a parameter-value pair of a URL) or in metadata, such as a referrer tag.

At step 302, the first application may determine whether a user of the client device has interacted with the content item (e.g. clicking on the item, selecting the item via a touch interface, etc.). If not, steps 300-302 may be repeated, e.g. with different or the same content item. If an interaction is detected, then at step 304, the first application or an operating system of the device may display a login prompt for the user. The user may enter user credentials such as a user name, account name, password, biometric data, or other such information. In some implementations, the first application or operating system may have previously displayed a prompt or authenticated the user; in such implementations, step 304 may be skipped. At step 306, the credentials may be transmitted to an authentication server 110. The credentials may be encrypted, hashed, or otherwise obfuscated to protect user privacy and enhance security. In some implementations, the transmission may include a device identifier, user identifier, account identifier, application identifier (e.g. of the first application and/or of the application to be installed), an identification of the content item, an identification of the parameter and/or the parameter value, or any other such information.

At step 308, the authentication server 110 may determine if the credentials are valid (e.g. whether the credentials match account credentials or device credentials in a credential or account database of the authentication server). If the credentials do not match, then the credentials may be rejected at step 310. In some implementations in which the user has not yet registered an account with an authentication server, the client device 250 may instead provide a new account registration interface via which the user may create an account to be registered with the authentication server 110. Once registered, the account may be confirmed as discussed above (or step 308 may be skipped).

At step 312, the authentication server 110 may store an association between the user or device credentials and the content item and/or the parameter. In some implementations, an association between the content item and the parameter may already be stored by the authentication server or otherwise available to the content server (e.g. from a content provider or publisher server). For example, an association between a first content item linking to an application and first parameters may be stored, and an association between a second content item linking to the application and second parameters may be stored. As such, the authentication server need only store an identification of which content item was provided to a device or user in order to determine the corresponding parameter. Similarly, the parameter need not be provided by the client device, but rather merely the identification of the content item. In other implementations, the parameter value may be provided to the authentication server for storage. At step 314, in some implementations, the authentication server may provide an authorization confirmation or authentication token to the client device. The authentication token or confirmation may comprise a cookie, cryptographic key, or other type of identifier.

At step 316, the client device 250 may download and install the new application. In some implementations as discussed above, the client device may execute an installation application or App Store application to interface with an application server or content delivery system to retrieve the application. As discussed above, the application may be compressed or encrypted, and the installation application may decompress and/or decrypt and install the application.

At step 318, the new application may be executed or launched. In some implementations, the new application may be launched automatically as soon as installation is complete, while in other implementations, the user may manually launch the application. As discussed above, the application may comprise any type and form of application, including a game, utility or office application, media application, social network application, or any other type and form of application.

At step 320, in some implementations, the new application or operating system may display a login prompt, similar to that at step 304, to receive user or device credentials. In other implementations, as discussed above, the new application may retrieve credentials from the first application or an operating system of the client device (e.g. stored when the user previously provided credentials) or may retrieve an authorization token provided to the device (e.g. at step 314 or at a previous instance of authentication). At step 322, the new application may transmit the credentials or authorization token to the authentication server.

At step 324, the authentication server may confirm that the credentials are valid, similar to step 308. If the credentials are not valid, the authentication server may reject the credentials at step 310. If the credentials are valid, at step 326, the authentication server may retrieve the stored association of the credentials and the content item and/or parameter for the application. In some implementations, the authentication server may look up the stored association via the user or device credentials and/or the application type or an application identifier provided with the credentials; and may identify the corresponding content item or parameter. In a further implementation, once identifying the content item, the authentication server may separately look up the parameter (e.g. in a content item-parameter storage, by retrieving the parameter from a publisher or content delivery network, etc.). At step 328, the authentication server may provide an authorization confirmation, as at step 314, and/or the retrieved parameter. The parameter may be data for use by the application (e.g. increment token counter by n, or a similar command), or may be an unlock code used by the application. At step 330, the parameter may be utilized by the application to provide the customized application or customized content.

Accordingly, the systems and methods discussed herein allow for authentication of users to enable custom applications or content to be provided to users for use within a newly installed application, despite parameters or referrer tags being removed by application stores or other third-party application providers.

In one aspect, the present disclosure is directed to a method for parameterized application installation and launch. The method includes receiving, by a device, a content item comprising an identification of an application and a parameter for use by the application. The method also includes detecting, by the device, an interaction by a user with the content item. The method also includes transmitting, by the device, authentication credentials of the user and an identification of the content item to an authentication server, the authentication server storing the identification of the content item in association with the user. The method also includes installing the application, by the device, responsive to detection of the interaction by the user with the content item, the application executed upon completion of installation. The method includes retransmitting, by the device, the authentication credentials of the user to the authentication server, responsive to execution of the application. The method also includes receiving, by the device from the authentication server, an identification of the parameter for use by the application, the parameter retrieved responsive to the storage of the identification of the content item in association with the user and the retransmission of the authentication credentials of the user. The method also includes utilizing the received parameter within the application, by the device, responsive to receipt of the identification of the parameter.

In some implementations, the parameter for use by the application is not stored locally while installing the application. In some implementations, the parameter for use by the application is not accessible by the application prior to receipt of the identification of the parameter from the authentication server.

In some implementations, transmitting the identification of the content item includes transmitting the identification of the parameter for use by the application. In some implementations, the identification of the application and the parameter for use by the application are included in a resource identifier; and the method includes downloading the application, by the device via an installation application, at an address corresponding to the resource identifier, the installation application removing the parameter for use by the application from the resource identifier prior to installation of the application.

In some implementations, transmitting authentication credentials of the user includes displaying a prompt for authentication credentials; and receiving authentication credentials from the user. In a further implementation, retransmitting the authentication credentials includes redisplaying the prompt for authentication credentials; and re-receiving authentication credentials from the user.

In another aspect, the present application is directed to a method for parameterized application installation and launch. The method includes providing, by a server to a device, a content item comprising an identification of an application and a parameter for use by the application. The method includes receiving, by the server from the device, authentication credentials of a user of the device and an identification of the content item. The method includes storing, by the server, the identification of the content item in association with the user. The method includes subsequently receiving, by the server from the application of the device, the authentication credentials of the user, the application executed by the device responsive to completion of installation of the application. The method includes retrieving, by the server, the identification of the content item and the parameter for use by the application based on receipt of the authentication credentials of the user. The method includes transmitting the parameter, by the server to the device, the application of the device utilizing the received parameter.

In some implementations, the parameter for use by the application is not stored by the device while installing the application. In some implementations, the parameter for use by the application is not accessible by the application prior to receipt of the identification of the parameter from the authentication server. In some implementations, receiving the identification of the content item includes receiving the identification of the parameter for use by the application. In some implementations, receiving the identification of the content item includes redirecting the device, by the server, to an application installation server. In a further implementation, redirecting the device to the application installation server further comprises providing a resource identifier corresponding to the application, the resource identifier not including the parameter for use by the application. In another further implementation, redirecting the device to the application installation server includes providing a resource identifier corresponding to the application including the parameter for use by the application, the application installation server removing the parameter upon receipt of a request for the application from the device.

In another aspect, the present application is directed to a system for parameterized application installation and launch. The system may comprise one or more devices configured to carry out the methods of the aspects described above. For example, the system may include a device comprising a network interface in communication with an authentication server and an application server. The device executes a first application configured to: receive a content item comprising an identification of a second application and a parameter for use by the second application; detect an interaction by a user with the content item; and transmit authentication credentials of the user and an identification of the content item to the authentication server, the authentication server storing the identification of the content item in association with the user. The device is configured to retrieve and install the second application from the application server, responsive to detection of the interaction by the user with the content item, the second application executed upon completion of installation. The second application is configured to: retransmit the authentication credentials of the user to the authentication server, responsive to execution of the second application; receive, from the authentication server, an identification of the parameter for use by the second application, the parameter retrieved responsive to the storage of the identification of the content item in association with the user and the retransmission of the authentication credentials of the user; and utilize the received parameter within the second application, responsive to receipt of the identification of the parameter.

In some implementations, the parameter for use by the second application is not stored locally while installing the second application. In some implementations, the parameter for use by the second application is not accessible by the second application prior to receipt of the identification of the parameter from the authentication server.

In some implementations, the first application is further configured to transmit the identification of the parameter for use by the second application. In some implementations, the identification of the application and the parameter for use by the application are included in a resource identifier; and the device is further configured to retrieve and install the second application via an installation application, at an address corresponding to the resource identifier, the installation application removing the parameter for use by the second application from the resource identifier prior to installation of the second application. In some implementations, the second application is further configured to display a prompt for authentication credentials; and receive the authentication credentials from the user.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, such as a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks may include a local area network ("LAN") and a wide area network ("WAN"), an inter-network (e.g., the Internet), and peer-to-peer networks (e.g., ad hoc peer-to-peer networks).

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

For example, it will be appreciated that the custom content referred to herein may take any form. By way of example only, the custom content may include an incentive for installing the application, such as coupons or tokens or the like.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed:

1. A method for parameterized application installation and launch, comprising:

receiving, by a device, a content item comprising an identification of an application and a parameter for use in customizing the application or providing customized content by the application;

detecting, by the device, an interaction by a user with the content item;

transmitting, by the device, authentication credentials of the user and an identification of the content item to an authentication server, the authentication server storing the identification of the content item in association with the user;

installing the application, by the device, responsive to detection of the interaction by the user with the content item, the application executed upon completion of installation;

retransmitting, by the application installed on the device, the authentication credentials of the user to the authentication server, responsive to execution of the application;

receiving, by the device from the authentication server, an identification of the parameter for use by the application, the parameter retrieved responsive to the storage of the identification of the content item in association with the user and the retransmission of the authentication credentials of the user; and utilizing the received parameter within the application, by the device, to customize the application or provide customized content by the application, responsive to receipt of the identification of the parameter.

2. The method of claim 1, wherein the parameter for use by the application is not stored locally while installing the application.

3. The method of claim 1, wherein the parameter for use by the application is not accessible by the application prior to receipt of the identification of the parameter from the authentication server.

4. The method of claim 1, wherein transmitting the identification of the content item further comprises transmitting the identification of the parameter for use by the application.

5. The method of claim 1, wherein the identification of the application and the parameter for use by the application are included in a resource identifier; and wherein installing the application further comprises downloading the application, by the device via an installation application, at an address corresponding to the resource identifier, the installation application removing the parameter for use by the application from the resource identifier prior to installation of the application.

6. The method of claim 1, wherein transmitting authentication credentials of the user further comprises displaying a prompt for authentication credentials; and receiving authentication credentials from the user.

7. The method of claim 6, wherein retransmitting the authentication credentials further comprises redisplaying the prompt for authentication credentials; and re-receiving authentication credentials from the user.

8. A method for parameterized application installation and launch, comprising:

providing, a device, a content item comprising an identification of an application and a parameter for use by the application in customizing the application or providing customized content;

receiving, by an authentication server from the device, authentication credentials of a user of the device and an identification of the content item;

storing, by the authentication server, the identification of the content item in association with the user;

subsequently receiving, by the authentication server from the application of the device, the authentication credentials of the user, the application executed by the device responsive to completion of installation of the application, and the authentication credential retransmitted to the authentication server responsive to execution of the application;

retrieving, by the authentication server, the identification of the content item and the parameter for use by the application in response to receipt of the authentication credentials of the user; and transmitting the parameter, by the authentication server to the device, the application of the device utilizing the received parameter.

9. The method of claim 8, wherein the parameter for use by the application is not stored by the device while installing the application.

10. The method of claim 8, wherein the parameter for use by the application is not accessible by the application prior to receipt of the identification of the parameter from the authentication server.

11. The method of claim 8, wherein receiving the identification of the content item further comprises receiving the identification of the parameter for use by the application.

12. The method of claim 8, wherein receiving the identification of the content item further comprises redirecting the device, by the server, to an application installation server.

13. The method of claim 12, wherein redirecting the device to the application installation server further comprises providing a resource identifier corresponding to the application, the resource identifier not including the parameter for use by the application.

14. The method of claim 12, wherein redirecting the device to the application installation server further comprises providing a resource identifier corresponding to the application including the parameter for use by the application, the application installation server removing the parameter upon receipt of a request for the application from the device.

15. A system for parameterized application installation and launch, comprising:

a device comprising one or more processors, a memory, and a network interface in communication with an authentication server and an application server, the device executing a first application stored in the memory and configured to:

receive a content item comprising an identification of a second application and a parameter for use by the second application in customizing the application or providing customized content, detect an interaction by a user with the content item, and transmit authentication credentials of the user and an identification of the content item to the authentication server, the authentication server storing the identification of the content item in association with the user;

wherein the device is configured to retrieve and install the second application from the application server, responsive to detection of the interaction by the user with the content item, the second application executed upon completion of installation; and wherein the second application is configured to:

retransmit the authentication credentials of the user to the authentication server, responsive to execution of the second application, receive, from the authentication server, an identification of the parameter for use by the second application, the parameter retrieved responsive to the storage of the identification of the content item in association with the user and the retransmission of the authentication credentials of the user, and utilize the received parameter within the second application, responsive to receipt of the identification of the parameter, to customize the second application or provide customized content by the second application.

16. The system of claim 15, wherein the parameter for use by the second application is not stored locally while installing the second application.

17. The system of claim 15, wherein the parameter for use by the second application is not accessible by the second application prior to receipt of the identification of the parameter from the authentication server.

18. The system of claim 15, wherein the first application is further configured to transmit the identification of the parameter for use by the second application.

19. The system of claim 15, wherein the identification of the application and the parameter for use by the application are included in a resource identifier; and wherein the device is further configured to retrieve and install the second application via an installation application, at an address corresponding to the resource identifier, the installation application removing the parameter for use by the second application from the resource identifier prior to installation of the second application.

20. The system of claim 15, wherein the second application is further configured to display a prompt for authentication credentials; and receive the authentication credentials from the user.

* * * * *